Oct. 3, 1961    R. T. FITZGERALD ET AL    3,002,509
ADJUSTABLE CAM FOLLOWER WITH DETENT RETAINING MEANS
Filed May 2, 1960
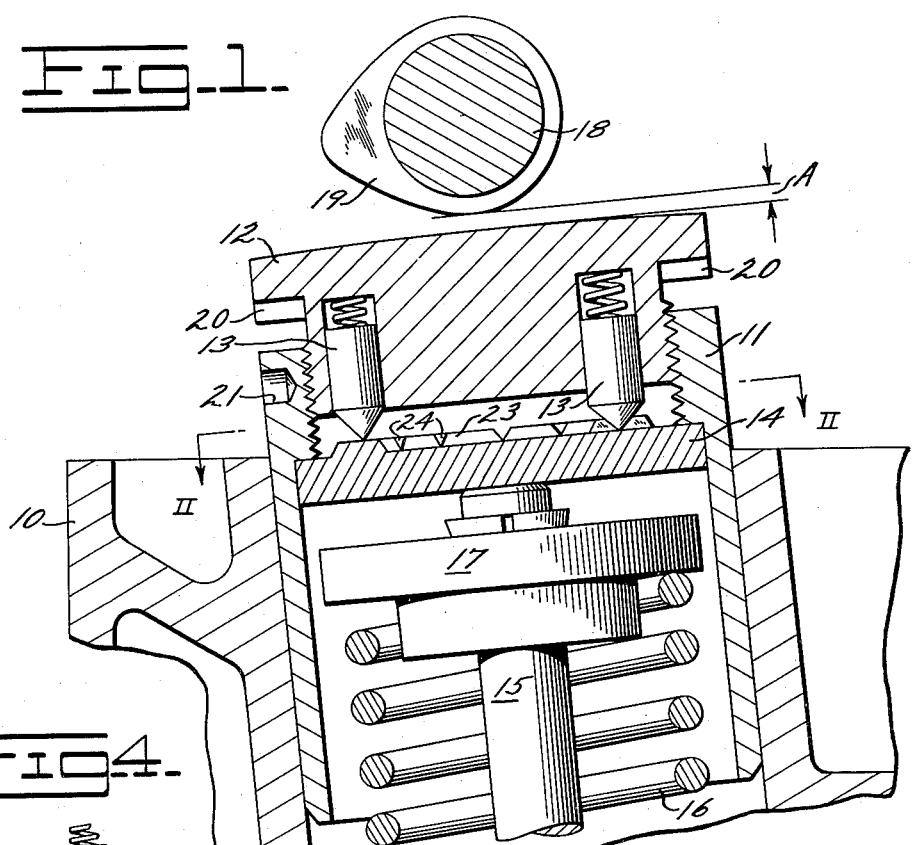
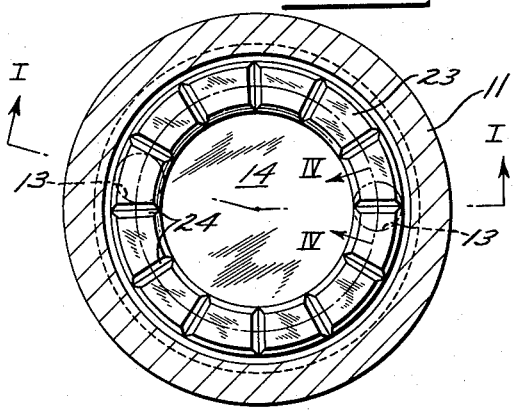
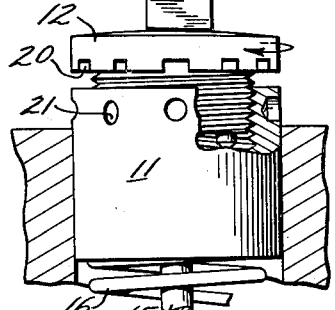
INVENTORS
ROBERT T. FITZGERALD
JACOB S. SALETZKI
BY
*Fryer and Griswold*
ATTORNEYS United States Patent Office 3,002,509
Patented Oct. 3, 1961

3,002,509
ADJUSTABLE CAM FOLLOWER WITH DETENT RETAINING MEANS
Robert T. Fitzgerald, East Peoria, and Jacob S. Saletzki, Peoria, Ill., assignors to Caterpillar Tractor Co., Peoria, Ill., a corporation of California
Filed May 2, 1960, Ser. No. 25,965
1 Claim. (Cl. 123—90)

This invention relates to cam followers of the kind employed in an internal combustion engine as for example the cam followers used between cams and valve stems where the cams are employed to open the valves against the force of springs which close them. The critical clearance in the valve actuating mechanism which is necessary to obtain smooth and efficient operation of an engine is difficult to attain and also difficult to maintain due to wear of engaging parts which effect opening and closing of the valves.

It is an object of the present invention to provide a cam follower which is very readily adjustable as to its length so that the desired clearance is easily obtained and to provide a follower which has detent or ratchet means for holding it in any desired position of adjustment to prevent accidental movement or variation in its effective length which might result from vibration during the operation of the engine of which it is a part.

Another object of the invention is to provide a cam follower in which critical clearance can readily be established without the use of the usual feeler gauges.

Further and more specific objects and advantages of the invention are made apparent in the following specification wherein reference is made to the accompanying drawings for a detailed description of the invention.

The invention is herein disclosed in its application to an engine of the type which has overhead cam shafts carrying cams arranged in alignment with the axes of the valves. The adaptability of the invention to other environments however will be apparent as the description proceeds.

In the drawings:

FIG. 1 is a sectional view through a portion of the cylinder head of an internal combustion engine showing a cam follower embodying the present invention in place therein between a cam and valve stem with which it is associated, the section being taken on the line I—I of FIG. 2;

FIG. 2 is a sectional view on the line II—II of FIG. 1;

FIG. 3 is a view in elevation taken at right angles to the view shown in FIG. 1 and with portions broken away; and FIG. 4 is a detail of detent mechanism viewed as from the line IV—IV of FIG. 2.

In FIG. 1 of the drawings, a portion of an engine head block is shown at 10 as being bored for the sliding reception of a cam follower 11. The cam follower is of generally cylindrical shape having one end closed by a threaded member 12 carrying a pair of spring biased detents 13 with a thrust plate 14 fixed within the cylindrical portion 11. The plate 14 is brazed or otherwise suitably secured in place, or could be formed as an integral part of the portion 11, and is engageable with the end of a valve stem 15 which may be the stem of any one of the intake or exhaust valves, not shown, of the engine. A spring 16 urges the valve to its closed position by engagement with a spring seat 17 fixed to the valve stem. Opening of the valve is effected by rotation of a cam shaft 18 with a cam 19 thereon, the lobe of which engages the outer end of the cam follower or adjustable part 12 thereof. The desired clearance represented by the space A, exaggerated in the drawings, between the end of the cam follower and the base circle of the cam is obtained by rotation of the member 12. To facilitate this rotation the periphery of the member 12 is notched as indicated at 20 in FIG. 3 for the reception of a spanner wrench or any other suitable tool which may be inserted in one of the notches for turning the member 12 relative to the body 11 of the follower. The body 11 is also preferably provided with peripherally spaced sockets 21 to receive a tool by means of which it may be held against rotation during adjustment.

In order to prevent accidental turning movement of the member 12, which would effect the desired critical clearance, the spring pressed detents 13 in the member engage an annular notched ridge 23 on the surface of the thrust member 14. The notches in the portion 23 are shown at 24 in FIG. 2 as being equally spaced throughout the full circle described by the member and the detents 13 are offset slightly from diametrically opposed positions so that one detent, as shown at the right of FIG. 2, is in a position to engage with one of the notches while the opposite detent rides on the crest of the member 23 between two notches. This affords an adjustment of the member 12 through small increments signaled by clicks caused by the detents snapping alternately into the notches and indicating an adjustment of a predetermined axial distance. For example, the pitch circle in which the detents are disposed and the spacing of the notches 24 are calculated in one production form of the invention to produce an axial movement of approximately .003" for each increment of movement which is signaled by the click of a detent entering a notch. Therefore, the clearance dimension A between the base circle of the cam and the follower can be set without the use of feeler gauges by first backing out the member 12 until it engages the base circle of the cam and thereafter turning it inwardly and counting the clicks from which the dimension of the space can be calculated.

It is considered desirable to rotate engine valves through a short distance each time that they are opened and closed to promote uniform wear of the valve and valve seat and this may be accomplished as shown in FIG. 3 by providing a slightly inclined surface on the cam 19 and a slight crown on the end of the cam follower which is engaged by the cam. With this construction the point of engagement of the cam with the crown is slightly eccentric and friction tends to impart rotation to the follower and through it to the valve stem and valve. If for any reason the force of this frictional engagement should be too great, there could be a tendency for the cam to alter the position of the member 12 by turning it at its point of threaded engagement with the cylindrical member 11. If at any time this tendency became sufficiently great to overcome the holding effect of the detent 13, the length of the cam follower would be changed and the clearance A would be increased or reduced. Reduction of this clearance is highly undesirable because if reduced beyond the zero point, the cams will hold the valves in an open position causing burning of the valves and necessitating costly repair. If on the other hand the clearance A is increased, objectionable noise occurs which calls the attention of the operator of the engine to the fact that adjustment is required and this adjustment can easily be made before damage results. For this reason, the point of engagement between the cams 19 and the adjustable members 12 is such that friction tends to thread the members inwardly and increase clearance thus providing insurance against serious damage to the engine from this cause.

We claim:

A cam follower for use between the end of a valve stem and a rotatable cam for imparting opening movement to the valve which comprises, a cylindrical part surrounding the valve stem and having a disc-shaped removable thrust plate engageable with the end of the stem, and a member between the cam and the thrust plate threaded to said cylindrical part for adjustment to and away from the cam to provide operating clearance, detent means for holding said member in its adjusted position, said detent means comprising annularly arranged equally spaced notches formed in said thrust plate, and at least two spring biased plungers disposed in said member inwardly of its threaded connection with the cylindrical part in positions to enter said notches one at a time and alternately upon rotation of said member, and means to facilitate engagement of haid cylindrical part and member with tools to effect relative rotation therebetween.

References Cited in the file of this patent

UNITED STATES PATENTS

| | | |
|---|---|---|
| 1,225,565 | Birkigt | May 8, 1917 |
| 1,910,813 | Powell | May 23, 1933 |